United States Patent [19]

Ozden et al.

[11] Patent Number: 5,870,551
[45] Date of Patent: Feb. 9, 1999

[54] LOOKAHEAD BUFFER REPLACEMENT METHOD USING RATIO OF CLIENTS ACCESS ORDER OFFSETS AND BUFFER DATA BLOCK OFFSETS

[75] Inventors: Banu Ozden, Summit; Rajeev Rastogi, New Providence; Abraham Silberschatz, Summit, all of N.J.

[73] Assignee: Lucent Technologies Inc., Murray Hill, N.J.

[21] Appl. No.: 629,118

[22] Filed: Apr. 8, 1996

[51] Int. Cl.[6] .............................. G06F 12/00; G06F 13/14; H04N 7/16

[52] U.S. Cl. ............................ 395/200.49; 395/200.16; 395/876; 348/7; 711/137

[58] Field of Search ...................................... 395/872, 876, 395/200.47, 200.48, 200.49, 200.56, 200.36, 200.61, 826, 841; 348/7; 711/133, 137

[56] References Cited

U.S. PATENT DOCUMENTS

| | | | |
|---|---|---|---|
| 5,150,472 | 9/1992 | Blank et al. | 711/137 |
| 5,453,779 | 9/1995 | Dan et al. | 348/7 |
| 5,461,415 | 10/1995 | Wolf et al. | 348/7 |
| 5,572,645 | 11/1996 | Dan et al. | 345/501 |
| 5,586,264 | 12/1996 | Belknap et al. | 395/200.49 |
| 5,592,612 | 1/1997 | Birk | 395/182.04 |
| 5,640,597 | 6/1997 | Noguchi et al. | 395/841 |

OTHER PUBLICATIONS

Papadimitriou et al. "Information Caching for Delivery of Personalized Video Programs on Home Entertainment Channels", Multimedia 1994 Int. Conf., pp. 214–223. CD: IEEE/IEE Publication Ondisc.

D.P. Anderson et al., "A file system for continuous media," *ACM Transactions on Computer Systems*, vol. 10(4), Nov. 1992, pp. 311–337.

S. Berson et al., "Staggered Striping in multimedia information systems," *Proceedings of ACM–SIGMOD, 1994 International Conference on Management of Data, Minneapolis, Minnesota*, May 1994, pp. 79–90.

M.S. Chen et al., "Optimization of the grouped sweeping scheduling (gss) with heterogeneous multimedia streams," *Proceedings of ACM Multimedia, Anaheim, CA*, Aug. 1993, pp. 235–242.

H.T. Chou et al., "An evaluation of buffer management strategies for relational database systems," *Proceeding of the Eleventh International Conference on Very Large Databases, Barcelona*, Aug. 1985, pp. 127–141.

A. Dan et al., "An online video placement based on bandwidth to space ratio (bsr)," *Proceedings of ACM–SIGMOD 1995 International Conference on Management of Data, San Jose California*,, May 1995, pp. 376–385.

C.S. Freedman et al., "The SPIFFI scalable video–on–demand system," *Proceedings of ACM–SIGMOD 1995 International Conference on Management of Data, San Jose, California*, 1995, pp. 352–363.

(List continued on next page.)

*Primary Examiner*—Dung C. Dinh
*Attorney, Agent, or Firm*—Vernon E. Williams; Kenneth M. Brown

[57] ABSTRACT

Two methods are disclosed for storing multimedia data that reduces the amount of disk I/O required by the system and cache misses experienced by the system. The first method determines the future access of each data buffer in a cache memory. Once the future of the data buffer is determined, the data buffer with the maximum future is allocated to store new blocks of data. The method approximates an optimal method of data buffer allocation, by calculating the future of a data buffer, relative to clients that will access the data buffers. The second method orders the clients based on the increasing distance of each client from the previous client; clients release the buffers in this order into a LIFO queue; if a buffer is selected to load a new block of data, the buffer at the head of the LIFO queue is selected.

5 Claims, 1 Drawing Sheet

OTHER PUBLICATIONS

W.L. Gettys, "DIRECTV and Oracle Rdb: The Challenge of VLDB transaction processing," *Proceedings of ACM–SIGMOD 1995 International Conference on Management of Data, San Jose, California,* May 1995, pp. 429–430.

A. Laursen et al., "Oracle media server: Providing consumer based interactive access to multimedia data," *Proceedings of ACM–SIGMOD 1994 International Conference on Management of Data, Minneapolis, Minnesota,* May 1994, pp. 470–477.

E.J. O'Neil et al., "The LRU–K page replacement algorithm for database disk buffering," *Proceedings of ACM–SIGMOD 1993 International Conference on Management of Data, Washington, DC,* May 1993, pp. 297–306.

B. Ozden, et al., "A low–cost storage server for movie on demand databases," *Proceedings of the Twentieth International Conference on Very Large Databases,* Santiago, Sep. 1994, pp.

B. Ozden et al., "A framework for the storage and retrieval of continuous media data," *Proceedings of the IEEE International Conference on Multimedia Computing and Systems,* Washington, D.C., May 1995, pp.

B. Ozden et al., "Demand paging for movie–on–demand servers," *Proceedings of the IEEE International Conference on Multimedia Computing and Systems,* Washington D.C., May 1995, pp.

M. Stonebraker, "Operating system support for database management," *Communications of the ACM,* vol. 24(7), 1981, pp. 412–418.

F.A. Tobagi et al., "A disk storage system for video and audio files," *Proceedings of ACM Multimedia,* Anaheim, CA, Aug. 1993, pp. 393–400.

5,870,551

LOOKAHEAD BUFFER REPLACEMENT METHOD USING RATIO OF CLIENTS ACCESS ORDER OFFSETS AND BUFFER DATA BLOCK OFFSETS

TECHNICAL FIELD

This invention relates to multimedia storage and buffer replacement.

BACKGROUND OF THE INVENTION

Modern computer and communications systems utilize large amounts of data. As a result data management and data storage have become significant technical issues when using modem computer and communications systems. Multimedia applications (e.g., applications which utilize video, audio, text, graphic, images) often have large data requirements which implicate large amounts of storage. Modern multimedia storage systems need to be able to manipulate both continuous media data such as video and audio, and conventional data such as text, graphics and images.

In current multimedia storage systems, data is often housed in a secondary storage media (e.g., magnetic disk) as blocks of data (one block consist of a series of contiguous bits). The data is then read from the secondary storage media into temporary memory [e.g., cache which consist of random access memory (RAM)], and then accessed by clients for use. FIG. 1 displays an illustrative architecture that manipulates multimedia data. In FIG. 1 secondary storage media such as a disk 10, is commonly used to store multimedia data. It should be appreciated that the secondary storage media may be a hard drive, an optical disk, or a mass storage system.

Data is typically housed in disk 10. In normal operations the disk 10 continuously rotates with a disk head (a device used to read data from the disk) raised above the disk 10. To read data from the disk 10 the disk head moves inward in a direction denoted by 13, the disk head is then lowered close to the disk 10 so that the disk head can read the data from the disk 10. The time it takes the disk to make one complete revolution is typically called the rotation time, the time it takes the disk head to move over the required data in a direction denoted by 13 is typically called the seek time, and the time required or the disk head to lower over the disk 10, is typically called the settle time.

After data blocks are located on the disk 10, the data blocks are usually read from the disk into a temporary memory area, typically known as the cache memory 30. To transmit data from the disk 10, into cache memory 30 requires that the data is first located on the disk, read from the disk, and then transferred into the cache. The entire process of finding the data blocks, reading the data blocks from the disk, and then transferring the data blocks into the cache is called the disk input/output(disk I/O).

Disk I/O is often limited by the disk bandwidth 20. The disk bandwidth 20 can be thought of as a pipe through which data flows. Normally the pipe has a limited amount of capacity (e.g. 44 Mbps), and only a certain amount of data can flow through the pipe per unit time. Therefore while tremendous amounts of data may be needed from the disk 10, the disk bandwidth 20 limits the speed at which the data can be transferred.

Client access to the cache memory 30 is managed by an admission controller 35. When clients (denoted by 50, 60 and 70) request access to the cache memory 30, the admissions controller determines if there is enough buffer space and disk bandwidth to accommodate the clients request. Once a client has been given access to the cache 3 0 by the admission controller 35, management of the cache memory 30 is performed by a buffer manager 40. The buffer manager 40 manipulates the cache memory every service cycle (a time interval specified by the system administrator - or calculated based on system resources).

The cache memory 30 includes a buffer pool 80. The buffer pool 80 is composed of a series of buffers as denoted by 90. The buffers 90 are tagged as either being used (filled with data blocks from the disk 10) or free (available to be used). The buffers that are tagged as being free, comprise the free buffer pool (buffers available for use).

In FIG. 1 when at least one of the clients 50, 60, or 70 first request data from the disk 10, the admissions controller 35 will check the cache memory 30 to determine if there are enough buffers 90 and bandwidth 20 to fulfill the request. If there are enough buffers 90 in the free buffer pool, and enough bandwidth 20, the admission controller 35, will allocate the buffers 90, so that the desired data blocks that a client will need could be stored in the buffers by the buffer manager 40 in every service cycle.

In the illustrative embodiment of FIG. 1 a continuous data file (denoted by 16 in FIG. 1) is composed of a series of contiguous blocks of data (denoted by A,B,C,D,E,F,G,H, and I in FIG. 1). For discussion purposes, lets assume that the continues data file 16 is video data, and the typical client displays a video and can perform Video Cassette Recorder (VCR) functions such as pause, resume, fast forward, jump and rewind. If the clients in the system are all reading data from the continuous data file 16, the location in the continuous data file 16, where a client is reading the data, can be denoted by 50a, 60a, and 70a (where 50a, 60a, and 70a, represent the positioning of clients 50, 60 and 70 relative to the continuous data file 16).

In the illustrative embodiment displayed in FIG. 2, client 50a may read block C next, client 60a may read block F next, and client 70a may read block J next. Therefore, with each service cycle, the clients move in a direction denoted by 17. When the clients move through the data in the direction denoted by 17 the clients are called forward progressing clients with respect to the block. When a client is expected to read a block of data after another client, the client that reads the data second is called the next forward progressing client with respect to the block of data. For example, 60a will read block F first, and then 50a will read block F. Therefore, with respect to block F, 50a is the next forward progressing client. Likewise, when clients are moving in the direction denoted by 18, the clients are considered backward progressing clients. For example, when client 60a reads data block E, then data block D, and then data block C, client 60a is considered a backward progressing client. Lastly, clients may fast forward, jump, pause, resume, and rewind within the continuous data file 16. For example, 50a may read block C and then jump to block G (this is comparable to a fast forward in a VCR), 60a may read block F and then backup and read block B (this is comparable to a rewind in a VCR), lastly, 50a may pause for a few service cycles and not read any data blocks (this is comparable to the pause command on a VCR).

The cache memory 30 serves a significant function in storage systems. For example, a client 50 may be displaying a video that is stored on the disk10. Without cache memory 30 the client would have to perform a full disk I/O to read each block of the continuous data file16. The task of performing a full disk I/O becomes particularly problematic when the data is continuous data (e.g., the client needs the data to arrive at a specified rate to realize continues video or audio). Therefore the cache memory 30 serves a critical function. Instead of each client performing a disk I/O to retrieve each data block, the data can be prefetched and held in cache memory, which would be much quicker for the client to access (since cache memory is usually composed of very fast Random Access Memory (RAM)). In addition, if a second client 60, also needs to access the same data as accessed by the first client 50, the second client would be able to simultaneously read the data without having to go back to the disk 10.

However, there are times when a block of data needs to be prefetched by a client and that block of data is not in the buffer, either because it was not prefetched from the disk before a client needed it, or was prefetched and was removed from the buffer before the requesting client used it. When the data block is not in a data buffer when it needs to be prefetched by a client, this is typically called a cache miss. The performance of buffer replacement methods can be characterized by the number of cache misses that the system experiences. The number of cache misses is often defined by a cache miss ratio, which is the ratio of the total number of buffer cache misses to the total number of accesses to data blocks. The lower the number of cache misses the better the performance of the system. For example, a system with a 88% cache miss ratio is better than a system with 90% cache miss ratio because in an 88% cache miss ratio cache misses only occur 88% of the time.

In multimedia storage systems where there are several clients accessing the same data, the cache is designed so that each client can reserve a number of the buffers for its use, since displaying video would require that data be transferred to the client at a particular rate (r). As mentioned previously, a new client requesting data would not be admitted to the system unless the admissions controller 35 verifies that there is enough buffer space, and disk bandwidth available. By assuring that there is enough buffer space and disk bandwidth available, the admissions controller 35 assures that the buffer manager can facilitates the transfer of data to the client at the required rate (r) in subsequent service cycles. If d is the size of one buffer 90, and $n_B$ denoted by 80 is the total of all the buffers in the cache 30, then $d*n_B$ would be the total buffer space. Therefore a real time client (50,60,or 70), requiring access to data at the rate (r), would not be admitted to the system by the admissions controller 35, unless its buffer requirement together with the total sum of buffer requirements of existing admitted clients, was less than or equal to $d*nB$.

As previously discussed at the beginning of a service cycle the buffer manager 40, checks each client to determine which data block stored in the buffer 90 were used by the client, and which data blocks need to be prefetched from the disk 10, for the clients upcoming use. This task is accomplished by the following steps:

1. The buffers containing data blocks, which were consumed in the last service cycle, are added to the free buffer pool, if the buffers were not consumed by other clients in the last service cycle.
2. The data blocks that need to be prefetched from disks in the current service cycle are determined.
3. Whether a data block that needs to be prefetched from disk is already in the cache memory (in the free buffer pool) is determined. If so, the buffer is removed from the free buffer pool.
4. For each block that needs to be prefetched and is not in the free buffer pool, a buffer, from the set of free buffers is allocated.
5. Disk I/O is issued to retrieve the needed data blocks from the disks into the allocated buffers.

Step (4) given above is called the buffer replacement method. Currently there are several buffer replacement methods in use. For example, in the Least Recently Used (LRU) buffer replacement method, the buffer that contains the data blocks that were used least recently (used the longest ago), is chosen as the buffer that is allocated to receive new data blocks. In another buffer replacement method, Most Recently Used (MRU), the buffers that contain the data blocks that were used most recently (used last), are the buffers that are allocated to receive new data blocks. However, these buffer replacement methods produces cache miss ratios that are close to 100% when used with continuous media data storage systems. Therefore, it would be advantageous to have a buffer replacement method that has a cache miss ratio that is lower than MRU and LRU for continuous media data.

There is one final buffer replacement method known as the optimal method. The optimal method is a theoretical method that is used as a baseline in simulations. The optimal method allocates the buffer that contains data blocks that will not be referenced by the client for the longest period of time. The optimal method correctly anticipates the next time a data block will be accessed, and replaces buffers that will not be accessed for the longest period of time.

However, the optimal method is not realizable in a real world storage system because the optimal method requires that the buffer manager correctly anticipates the behavior of clients. This is not possible, because a client may read data continuously, pause on a particular block of data, resume after pausing on a data block, and jump around within a continuous data file. In addition a new client may arrive at any time. Therefore as stated above, the optimal method is only useful in simulations to benchmark buffer replacement methods. However it would be advantageous to have a buffer replacement method that approaches the performance (cache miss ratio) of the optimal method.

SUMMARY OF THE INVENTION.

The present invention discloses two buffer replacement methods that can be used with continues media data. The two methods are called the "BASIC" method, and the "DISTANCE" method. Both of these methods produce a lower cache miss ratio than traditional buffer replacement methods such as Least Recently Used (LRU) and Most Recently Used (MRU). In addition the disclosed methods, more closely approximate the performance of the Optimal method than LRU and MRU.

In the "BASIC" method a future is determined for each data block in the buffer cache. The future is determined by assessing a value for all forward progressing clients that will access the data block and then assessing a value for all backward progressing clients that will access the data block. Once the values have been determined for all forward progressing clients, and all backward progressing clients, the lowest value is chosen as the future of that data block. After a similar analysis is performed for each data block in the buffer cache, the data block with the lowest future is allocated to be replaced by new data.

In the "DISTANCE" method the future of each data block is estimated by analyzing the relationship of the clients to the data blocks. The last data block that a first client has access is determined. An analysis is then made to determine the next client that will access the last data block, that was accessed by the first client. This analysis produces a "distance" value for each client. Repeating this procedure, a distance is then determined for each client accessing the continuous media file. The clients are then organized in a queue, in ascending order, based on their "distance" value. Therefore the client with the lowest distance value is at the beginning of the queue and the client with the highest distance value is at the end of the queue. The buffers associated with the last client (client with the highest distance value) in the queue are then released first, the buffers associated with the second to last client are released next and so on. The free buffer pool is implemented as a First in First Out (FIFO) queue. When a buffer needs to be replaced, the buffer at the head of the free buffer pool is selected first. Furthermore, when buffers of a client are released, they are placed at the end of the free buffer pool.

BRIEF DESCRIPTION OF THE DRAWINGS

The objects, advantages and novel features of the invention will be more fully apparent from the following detailed description when read in connection with the accompanying drawings wherein.

DETAILED DESCRIPTION OF THE INVENTION

The present invention discloses two separate methods for allocating buffers. Both methods utilize techniques to determining how data blocks will be used in the future, so that the buffers that house the data blocks can be allocated (released for new data) in a manner that will reduce disk I/O.

Figure 1:
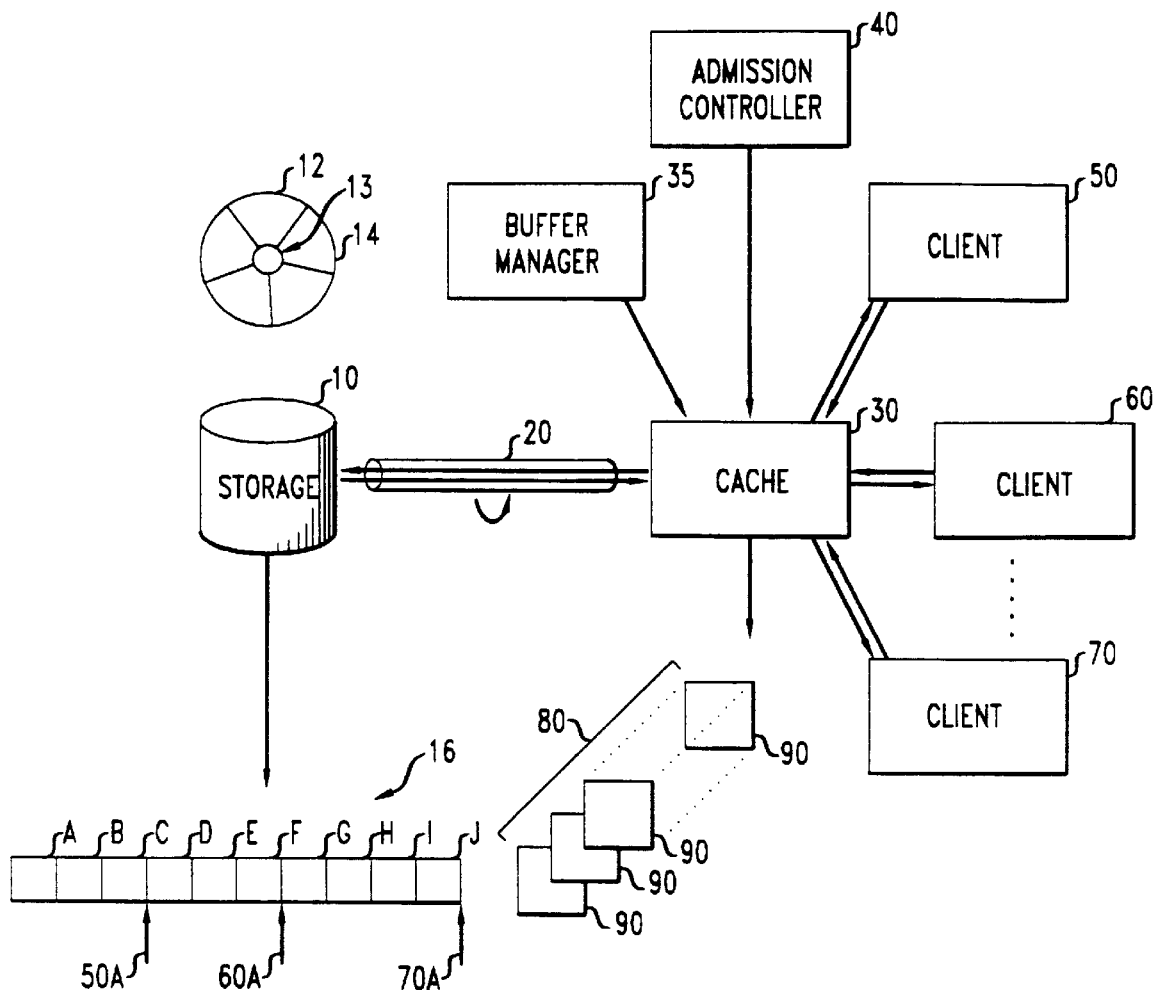
FIG. 1 displays the architectural framework of the present invention.
Figure 2:
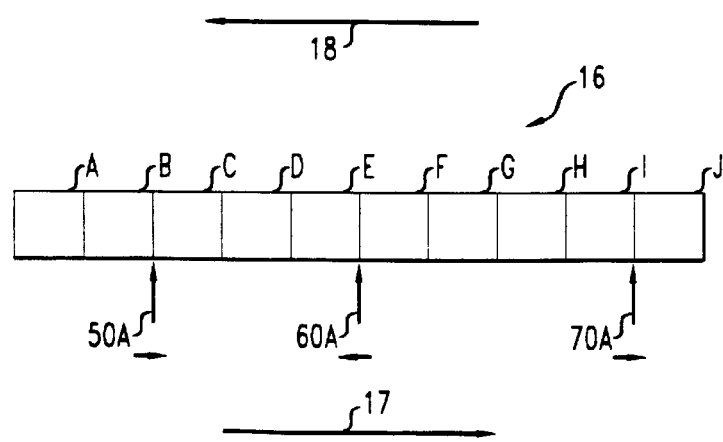
FIG. 2 displays a conceptual diagram of clients accessing a continuous media data file.

There are several parameters used in the disclosed methodology. FIG. 2 displays a continuous data file 16. The continuous data file 16 is composed of data blocks A, B, C, D, E, F, G, H, I, and J, such that A is the first block of the file. In FIG. 2, the clients 50a, 60a, and 70a, are all accessing different blocks of data. If 50a is a forward progressing client, then 50a will access data block C next, alternatively, when 50a is a backward progressing client 50a will access data block B in the next service cycle. If clients 60a and 70a are forward progressing clients they will read blocks F and J next, in the alternative, when clients 60a and 70a are backward progressing clients they will access blocks E and I next.

In addition to characterizing the state of a client as forward or backward progressing, a client can also be characterized by an offset. The offset of a client is defined as the offset of the next bit, which is expected to be consumed by the client, from the beginning of the file. Assuming that each block has (d) bytes of data, 50a has a client offset of 2d (blocks A and B), if 50a is a forward progressing client. Similarly, 60a has a client offset of 5d (blocks A, B, C, D, and E) and 70a has a client offset of 9d (blocks A, B, C, D, E, F, G, H, and I), if these clients are forward progressing.

A data block can also be characterized by an offset. The data block offset is the offset of the first bit of the data block from the beginning of the file. Therefore for example data block B has an offset of d, where d is a number of bits in the data block A. Data blocks C, D, and E have data block offsets of 2d, 3d and 4d, respectively.

The rate at which the client accesses the data block is the final parameter used in the "BASIC" and "DISTANCE" methods. Each of the clients could move at the same rate, move at different rates, or change rates with each service cycle. Therefore, assuming that client 60a and 70a are both backward progressing clients, over a period of several service cycles, client 70a could potentially reach block C before 60a depending on the rate (r) at which each client is moving.

THE "BASIC" METHOD

In the method defined as "BASIC" in the present invention, an assessment is made of the future of each data block. The data block that is predicted not to be used for the longest period of time, based on the assessment, is the data block that is replaced. Using FIG. 2 to illustrate the "BASIC" methodology, let's assume that 50a and 70a are forward progressing clients and 60a is a backward progressing client. Therefore 50a will use data block C next, 70a will use data block J next and 60a will use data block E next. Let's assume that all the client are moving at the same rate(r). To utilize the "BASIC" methodology disclosed in the present invention, it is necessary to predict the future of each block, and then choose the block that has the highest future when a buffer needs to be replaced. The block with the highest future, is the block released from the data buffer so that a new block of data can be stored. The future for each block is predicted by finding a forward progressing client value, and a backward progressing client value, for each client that will access the data block. The lessor of the forward progressing client value and the backward progressing client value is chosen as the future for that data block. The forward progressing client value is given by ratio (1) and the backward progressing client value is given by ratio (2), given below;

$$\text{Forward Moving Client:} \quad \frac{\text{offset of} - \text{offset of}}{\text{the data block} \quad \text{the client}} \quad (1)$$
$$\text{rate of the client}$$

$$\text{Backward Moving Client:} \quad \frac{\text{offset of} - \text{offset of}}{\text{the client} \quad \text{the data block}} \quad (2)$$
$$\text{rate of the client}$$

Data block D would be accessed by forward progressing clients 50a and backward progressing client 60a. The forward progressing client value for 50a would be 3d (the offset of data block D), minus 2d (the offset of the client 50a), divided by the rate of client 50a ($r_{50a}$). Therefore the forward progressing client value is $1d/r_{50a}$. The backward progressing client value 60a would be (5d−1) (the offset of the client minus one data bit), minus 3d (the offset of data block D), divided by the client rate. Therefore the backward progressing client value for 60a would be $(2d-1)/r_{60a}$. Once the calculations are made for all clients that will access data block D, the client with the lowest value is chosen as the future of the data block. Therefore for data block D, assuming that $r_{50a}$ is equivalent to $r_{60a}$, the future for data block D would be $1d/r_{50a}$ (since $1d/r_{50a}$ was the smaller value).

If there is no forward progressing client whose offset is less than the offset of the block the future is determined by formula (2). If there is a backward progressing client whose offset is greater than the offset of the block the future of the block would be the offset of the client. For example, using block B, the only client that will use data block B is client 60a. Data block B has already been accessed by client 70a and client 50a because they are forward progressing clients. The only client that can still read block B is 60a because 60a is a backward progressing client. The client offset of 60a is (5d−1), the data block offset of data block B is 1d, and the rate would be the rate of 60a ($r_{60a}$). Therefore the future of data block B would be $(5d-1d)/r_{60a}$.

Similarly for a block bj were there is no backward progressing client whose offset is greater than the offset of the block, the future of the block is determined by formula (1) if there is a forward progressing client whose offset is less than the offset of the block. If there is no client that is expected to access a block bi, then the future of the block is assumed to be greater than the future of any block that is expected to be accessed by a client. In this case, the future of the block bj is calculated as follows: Let max be the maximum of the futures among the block that are expected to be accessed by a client, $$\text{future for } bj = \max + \frac{\text{offset of } bi}{\text{default rate of the file to which } bi \text{ belongs.}}$$

Furthermore, the calculation of futures can be changed for blocks such as bi, bj and bk if an estimate has to be made of the interim title to the new client that will arrive next to the same file. Such extensions are simple to add to the basic method.

Once the futures of all the data blocks are determined, the data blocks are organized in descending order (from the block with the highest future, to the block with the lowest future). The buffer that houses the data block with the highest future is replaced (released for new data) first, when there is a need to replace the buffer.

THE DISTANCE METHOD

Another buffer replacement method disclosed in the present invention is entitled "DISTANCE". The "DISTANCE" method estimates the next time a data block will be accessed by analyzing the relative positioning of the clients. The distance value (x) of a client $c_{hi}$ to a previous client is defined by the following ratio:

$$\frac{\text{client offset of the client } c_{hi} -}{\frac{\text{client offset of the next client that will access the}}{\text{data block last accessed by client } c_{hi}}} \quad (3)$$

Where |x|, represents the absolute value of x. Using the clients depicted in FIG. 2 as an example, assuming once again that client 50a and 70a are forward progressing clients and client 60a is a backward progressing client; the last data block that client 70a accessed is data block I. The only other client that will access data block I in the scenario depicted in FIG. 2 is client 50a. From the perspective of client 70a, client 70a is the first client and client 50a is the next client. The offset of client 70a is 9d (counting blocks A,B,C,D,E, F,G,H and I). The offset of client 50a is 2d. Therefore the distance value of the client 70a to the previous client is $|9d-2d|/r_{50a}$.

A similar analysis can be performed for client 60a. The last block that client 60a accessed is data block F. The next client that will access data block F after client 60a, is client 50a. From the perspective of client 60a, client 60a is the first client and client 50a is the next client. The offset of client 60a is 5d−1. The offset of client 50a is 2d. Therefore the future for client 60a is $|5d-1-2d|/r_{50a}$. Lastly, client 50a accessed data block B last. The next client to access data block B is client 60a. The offset of client 60a is 5d−1. The offset of client 50a is 2d. Therefore ratio (3) would be defined by $|5d-2d|/r_{60a}$. Assuming that $r_{60a}$ is larger than $r_{50a}$, and arranging the distance values in a client queue based on increasing order, client 50a with the lowest value would be first, client 60a with the middle value would be next and client 70a with the highest value would be last. The "DISTANCE" method then requires that the data blocks associated with the clients (50a, 60a, and 70a) be released into a free-buffer pool maintained as a First in First Out (FIFO) queue such that the last client releases buffers it consumes in the previous cycle first, then the second to last client releases buffers it consumes in the previous cycle second, and so on (this process may continue until all the buffers are released). Therefore since 70a is the last client in the client queue, the data block previously accessed by 70a (data block) would be released first. Since 60a is placed in the queue next, the data block previously accessed by 60a (data block F) would be released next, and since data blocks consumed by 50a was put in the queue last, the data block previously accessed by 50a (data block B) would be released last. It should be appreciated that if there is no client that will access the data block previously access by client $c_i$, then the distance of client $c_i$ to the previous client, is assumed to be infinity. Thus such clients will be lost in the client queue.

One can come up with other ways to calculate the distance $c_i$ to the previous client by, for example, estimating the arrival time of new client. For example, if this removal time can be estimated, then the distance of client $c_i$ to the previous client will be as follows:

$$\text{the arrival time of the new client} - \text{current time} + \frac{\text{offset of } c_i}{\text{default rate of the file}}$$

An additional embodiment of the present invention can be performed by maintaining a separate Most Recently Used (MRU) list for each client. When one needs to select a victim buffer, it is selected from the MRU list of the client with a distance to the previous client that is the highest.

While several embodiments of the invention are disclosed and described, it should be appreciated that various modifications may be made without departing from the spirit of the invention or the scope of the subjoined claims.

The invention claimed is:

1. A method of managing data utilizing data buffers, said method comprising the steps of:
   determining a future of each of said plurality of data buffers,
   ordering each of said data buffers based on said future, and
   releasing said plurality of data buffers based on the order,
   wherein said future of said plurality of data buffers is determined by:
      determining which clients will access each of said plurality of data buffers,
      determining a client offset for each of said clients that will access each of said plurality of data buffers,
      determining a rate for each of said clients,
      determining a data buffer offset for each of said plurality of data buffers,
      comparing said data buffer offsets with said client offset, and
      performing a ratio of each of said comparisons with a rate of each of said clients,
   wherein the ratio is the future of the data buffer.

2. A method of allocating data buffers, wherein said data buffers are accessed during a service cycle by a plurality of forward progressing clients and backwards progressing clients, said method comprising the steps of:
   selecting each of said data buffers,
   analyzing each of said plurality of forward progressing clients that will access each of said data buffers, thereby producing forward progressing client values for each of said data buffers, analyzing each of said plurality of backward progressing clients that will access each of said data buffers, thereby producing backward progressing client values for each of said data buffers, determining a future of each of said data buffers by choosing a lowest value from said forward progressing client values and said backward progressing client values, ordering said data buffers based on said futures, and allocating said data buffers based on said ordering, wherein said forward progressing client values are produced by:

selecting a data buffer, determining each forward progressing client that will access said data buffer in said service cycle, determining a client offset for each forward progressing client that will access said data buffer in said service cycle, determining a data block offset for said data buffer that will be accessed by each of said forward progressing clients, comparing said data block offsets to said client offsets, and producing a forward progressing client value for each of said forward progressing clients by taking a ratio of said comparison with a rate of said forward progressing client.

3. A method of allocating data buffers, wherein said data buffers are accessed during a service cycle by a plurality of forward progressing clients and backwards progressing clients, said method comprising the steps of:

selecting each of said data buffers, analyzing each of said plurality of forward progressing clients that will access each of said data buffers, thereby producing forward progressing client values for each of said data buffers, analyzing each of said plurality of backward progressing clients that will access each of said data buffers, thereby producing backward progressing client values for each of said data buffers, determining a future of each of said data buffers by choosing a lowest value from said forward progressing client values and said backward progressing client values, ordering said data buffers based on said futures, and allocating said data buffers based on said ordering, wherein said backward progressing client values are produced by:

selecting a data buffer, determining each backward progressing client that will access said data buffer in said service cycle, determining a client offset for each backward progressing client that will access said data buffer in said service cycle, determining a data block offset for said data buffer that will be accessed by each of said backward progressing clients, comparing said client offset to said data block offset, and producing a backward progressing client value for each of said backward progressing clients by taking a ratio of said comparisons with a rate of said backward progressing client.

4. A method of allocating data buffers comprising the steps of:

determining a distance value for each client which accessed each of said data buffers, ordering said data buffers accessed by said client based on said distance value, and allocating said data buffers accessed by said client based on said distance value, wherein said distance value is determined by:

determining a client offset of a first client that has accessed a data block, determining a client offset of a next client that will access said data block, comparing said client offset of said first client with said second client, thereby producing a comparison value, and taking a ratio of said comparison value and a rate of said next client thereby producing said distance value.

5. A method of allocating buffers comprising the steps of:

(a) selecting a first client, (b) determining a buffer that the first client has accessed last, (c) determining a next client that will access said buffer, (d) determining a client offset of said first client, (e) determining a client offset of said next client, (f) comparing said client offset of said first client and said client offset of said next client, (g) determining a distance of said buffer by formulating a ratio of said comparison to a rate of said next client, (h) performing steps (a) through (g) for each client, thereby determining a distance for each client, (i) ordering the clients based on the distance, and (j) releasing said clients based on said distance.

* * * * *